United States Patent
Zhao

(10) Patent No.: US 11,294,365 B2
(45) Date of Patent: Apr. 5, 2022

(54) ESTIMATION METHODS OF ACTUATOR FAULTS BASED ON BAYESIAN LEARNING

(71) Applicant: Jiangnan University, Wuxi (CN)

(72) Inventor: Shunyi Zhao, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/393,454

(22) Filed: Aug. 4, 2021

(65) Prior Publication Data

US 2021/0373544 A1 Dec. 2, 2021

Related U.S. Application Data

(63) Continuation of application No. PCT/CN2020/105678, filed on Jul. 30, 2020.

(30) Foreign Application Priority Data

May 27, 2020 (CN) .......................... 202010462038.6

(51) Int. Cl.
*G05B 23/02* (2006.01)
*G06N 7/00* (2006.01)
*G06K 9/62* (2006.01)

(52) U.S. Cl.
CPC ....... *G05B 23/0254* (2013.01); *G06K 9/6278* (2013.01); *G06N 7/005* (2013.01)

(58) Field of Classification Search
CPC ... G05B 23/0254; G06K 9/6278; G06N 7/005
See application file for complete search history.

(56) References Cited

U.S. PATENT DOCUMENTS 6,502,042 B1 12/2002 Eid et al.
9,002,678 B1 4/2015 Cheded et al.
(Continued)

FOREIGN PATENT DOCUMENTS

CN 105716844 A 6/2016
CN 106569487 A 4/2017
(Continued)

OTHER PUBLICATIONS

Gerland et al., Robust Adaptive Fault Detection Using Global State Information and Application to Mobile Working Machines, IEEE, (Year: 2010).*

(Continued)

*Primary Examiner* — Mohammad K Islam
(74) *Attorney, Agent, or Firm* — IPro PLLC; Na Xu

(57) ABSTRACT

The present disclosure relates to estimation methods of actuator faults based on Bayesian learning. An actuator fault is modeled based on a random walking model, and a joint posterior probability distribution of a system state variable and the actuator fault is represented using two mutually independent hypothesis distributions based on a variational Bayesian theory; a system state variable and an actuator fault of a system at a moment are predicted at a moment; and a predicted system state variable and a predicted actuator fault are iteratively updated at the moment according to the Bayesian theory to output an estimated value of the system state variable at the moment, a variance of the estimated value and an estimated value of the actuator fault at the moment and a variance of the estimated value.

9 Claims, 6 Drawing Sheets

(56) References Cited

U.S. PATENT DOCUMENTS

2016/0189050 A1* 6/2016 Jaramillo-Velasquez .................... G05B 23/024
706/52
2020/0182684 A1* 6/2020 Yoskovitz .............. G01N 29/14

FOREIGN PATENT DOCUMENTS

| CN | 108776274 A | 11/2018 |
|---|---|---|
| CN | 109829938 A | 5/2019 |
| CN | 109857094 A | 6/2019 |

OTHER PUBLICATIONS

Mbalawata, Isambi S. "Adaptive metropolis algorithm using variational Bayesian adaptive Kalman filter computational statistics and data analysis" Mar. 15, 2015.

* cited by examiner

ESTIMATION METHODS OF ACTUATOR FAULTS BASED ON BAYESIAN LEARNING

TECHNICAL FIELD

The present disclosure relates to the field of system detection, and particularly to a estimation methods of actuator faults based on bayesian learning.

BACKGROUND

A perfect automatic control system usually includes basic elements such as a measurement feedback element, a comparison element, an amplification element, a correction element, an actuating element, and a controlled object. The actuating element, i.e., an actuator, is usually also called a driver, a brake, an essentiator, an initiator, an exciter, and a regulator, and is a generic term of elements for driving, transmitting, pulling, and operating devices, mechanisms, or components. In the automatic control system, a measured value of a controlled variable is compared with a set value in a controller to obtain a deviation, then the controller performs operation according to a specified control rule and sends a corresponding control signal to drive the actuator, and the actuator directly implements control to regulate the controlled object to change the controlled variable according to an expected value. For example, in production of the process industry, a reaction temperature of a chemical reactor is usually controlled by changing a coolant flow rate of a reactor jacket by a control valve, and a fault of the control valve will cause the reaction temperature not to change as expected, which will affect a conversion rate of a chemical reaction, the yield of a product, and the quality of the product. In a thyristor direct current speed control system, a rotating speed regulator controls a trigger device of a thyristor rectifier to change a direct current voltage obtained by rectification to thereby regulate a rotating speed of a direct current motor, and a fault of the rectifier will cause an overvoltage, an overcurrent and even an element damage. Therefore, the actuator is an essential and important terminal actuating element in the whole automatic system, and it affects the regulation quality and safe and stable running of the control system greatly.

As an important part of an automatic control system, the running health degree of an actuator determines the control effect of the automatic control system, and further affects the safety and reliability of the whole control process. Therefore, fault diagnosis of the actuator in the automatic control system is quite important. At present, many international journals have reported methods for fault diagnosis of an actuator in a control loop. For example, Alrowaie et al. detected and isolated faults in a nonlinear state space by particle filtering under a multi-model structure (F. Alrowaie, R. B. Gopaluni, K. E. Kwok, Control Engineering Practice, 2012, 20: 1016-1032). Zhong et al. designed an optimal fault diagnosis algorithm for a linear discrete time varying system (M. Zhong, S. Ding, E. Ding, Automatica, 2010, 46: 1395-1400). He et al. designed an algorithm for a fault of a micro actuator by means of denoising, detrending, etc., (Z. He, Yuri, Shardt, D. Wang, B. Hou, H. Zhou, J. Wang, Control Engineering Practice, 2018, 74: 1-12). Nguyen et al. proposed estimation of an actuator fault using a sliding-mode observer (N. P. Nguyen, N. X. Mung, S. K. Hong, Sensors, 19(21): 4721). Zhang et al. designed an adaptive sliding-mode observer for a diesel engine fault (H. Zhang, J. Wang, IEEE/ASME Transactions Mechatronics, 21(4): 2027-2038). Ding elaborated existing model-based fault diagnosis technologies in his book (S. X. Ding, New York, N.Y., USA: Springer, 2013).

However, the foregoing methods are mainly for diagnosis of actuator faults, and do not consider estimation of actuator faults. That is, in the foregoing methods, it can only be determined that a fault occurs to an actuator, but further information about an amplitude of the fault, a position where the fault occurs, a nature of the fault, etc., cannot be provided, so that required information cannot be provided for subsequent troubleshooting. It is known that fault estimation is usually more important than fault diagnosis, and this is mainly because fault estimation can not only provide time when the fault occurs and the magnitude of the fault but also provide the position where the fault occurs and the nature of the fault. At present, there are only actuator fault estimation methods for systems of which system state variables are determined. In a practical process, due to factors such as a working environment, equipment aging, and a human factor, a control loop usually presents relatively high randomness, an automatic control system of which a system state variable is random (i.e., a random system) is very common, and there is yet no actuator fault estimation method for such a random system at present.

SUMMARY

Technical Problem

In the prior art, an actuator fault of a random system cannot be estimated to implement actuator fault diagnosis and further obtain further information about an amplitude of the fault, a position where the fault occurs, a nature of the fault, etc.

Technical Solution

The present disclosure provides a estimation methods of actuator faults based on bayesian learning, including the following steps:

step (1): modeling an actuator fault as follows based on a random walking model:

$$f_k = f_{k-1} + w_k^f \qquad \text{(formula 1)},$$

where $f_k$ is a potential actuator fault at a moment k, $f_{k-1}$ is a potential actuator fault at a moment k−1, $w_k^f$ is a process noise, and k is a time sequence;

step (2): representing a joint posterior probability distribution $p(x_k, f_k | y_{1:k})$ of a system state variable $x_k$ and the actuator fault $f_k$ using two mutually independent hypothesis distributions $q(x_k | y_{1:k})$ and $q(f_k | y_{1:k})$ based on a variational Bayesian theory, namely:

$$p(x_k, f_k | y_{1:k}) = q(x_k | y_{1:k}) q(f_k | y_{1:k}) \qquad \text{(formula 2), and}$$

approximating the joint posterior probability distribution of the system state variable $x_k$ and the actuator fault $f_k$ at the moment k−1 as follows:

$$q(x_{k-1} | y_{1:k-1}) = N(\hat{x}_{k-1}, P_{k-1}) \qquad \text{(formula 3), and}$$

$$q(f_{k-1} | y_{1:k-1}) = N(\hat{f}_{k-1}, \Delta_{k-1}) \qquad \text{(formula 4),}$$

where $y_{1:k} = \{y_1, y_2, \ldots, y_k\}$ represents a collection of observation signals from a moment 1 to the moment k, $\hat{x}_{k-1}$ represents an estimated value of the system state variable at the moment k−1, $P_{k-1}$ is a variance of $\hat{x}_{k-1}$, $\hat{f}_{k-1}$ is an estimated value of the actuator fault at the moment k−1, and $\Delta_{k-1}$ is a variance of $\hat{f}_{k-1}$;

step (3): predicting, at the moment k−1, a system state variable and an actuator fault at the moment k, and iteratively updating, at the moment k, a predicted system state variable and a variance and a predicted actuator fault and a variance according to the Bayesian theory to output an estimated value $\hat{x}_k$ of the system state variable $x_k$ at the moment k and a variance $P_k$ of the estimated value and to output an estimated value $\hat{f}_k$ of the actuator fault $\hat{f}_k$ at the moment k and a variance $\Delta_k$ thereof, i.e., an estimated value of the actuator fault and a variance of the estimated value;

step (4): judging whether k=step is satisfied, if YES, ending the method, otherwise k=k+1, and skipping to step (2), step being a maximum time length; and step (5): if the estimated value of the actuator factor is 0, determining that no actuator fault occurs, and if the estimated value of the actuator fault is deviated from 0, determining that an actuator fault occurs, and overhauling a system.

In a preferred example of the present disclosure, the following is further included: in step (3), predicted values at the moment k−1 are used as initial values for iterative updating at the moment k, namely $\hat{x}_k^{i=0}=\hat{x}_k^-$, $P_k^{i=0}=P_k^-$, $\hat{f}_k^{i=0}=\hat{f}_k^-$, and $\Delta_k^{i=0}=\Delta_k^-$, where i represents an iteration step count, and a maximum iteration step count thereof is set to N; $\hat{x}_k^-$ is a predicted value of the system state variable at the moment k; $P_k^-$ is a predicted variance of the system state variable at the moment k; $\hat{f}_k^-$ is a predicted value of the actuator fault at the moment k; $\Delta_k^-$ is a predicted variance of the actuator fault at the moment k; $\Theta=\tau I$, and I is a unit matrix; and $\tau\in(0,1]$ is an adjustable parameter.

In a preferred example of the present disclosure, the following is further included: in step (3), the system state variable and the variance at the moment k are predicted at the moment k−1 according to a dynamic model equation of an automatic control system where an actuator is located, as shown in formula (5):

$$\hat{x}_k^-=A\hat{x}_{k-1}+Bu_{k-1}+\hat{f}_{k-1} \quad \text{(formula 5), and}$$

$$P_k^-=AP_{k-1}A^T+\Delta k_{k-1}+BQ_kB^T \quad \text{(formula 6),}$$

where $\hat{x}_k^-$ is the predicted value of the system state variable at the moment k, $P_k^-$ is the predicted variance of the system state variable at the moment k, $\hat{x}_{k-1}$ is the estimated value of the system state variable at the moment k−1, $\hat{f}_{k-1}$ is the estimated value of the actuator fault at the moment k−1, $u_{k-1}$ is a controller output of the automatic control system where the actuator is located, $P_{k-1}$ is the variance of $\hat{x}_{k-1}$, $\Delta_{k-1}$ is the variance of $\hat{f}_{k-1}$, $Q_k$ is a variance of the process noise, A is a state transition matrix, and B is a controller input matrix.

In a preferred example of the present disclosure, the following is further included: iteratively updating the predicted system state variable and variance at the moment k according to the Bayesian theory specifically includes the following steps:

$$\hat{x}_k^i=\hat{x}_k^-+\hat{f}_k^{i-1}+K(y_k-C(\hat{x}_k^-+\hat{f}_k^{i-1})) \quad \text{(formula 7),}$$

$$P_k^i=P_k^--KCP_k^- \quad \text{(formula 8), and}$$

$$K=P_k^-C^T(CP_k^-C^T+R_k)^{-1} \quad \text{(formula 9),}$$

where $\hat{x}_k^i$ is an estimated value of the system state variable obtained by an i-th iteration at the moment k; $\hat{x}_k^-$ is the predicted value of the system state variable at the moment k; $\hat{f}_k^{i-1}$ is an estimated value of the actuator fault obtained by an i−1-th iteration; i represents the iteration step count, and a maximum iteration step count thereof is set to N; K is a filter gain in the automatic control system where the actuator is located; $y_k$ is an observed value of the system state variable at the moment k; C is an observation matrix of the system state variable; $P_k^i$ is a variance of the system state variable obtained by the i-th iteration at the moment k; $P_k^-$ is the predicted variance of the system state variable at the moment k; and $R_k$ is a variance of an observation noise.

In a preferred example of the present disclosure, the following is further included: in step (3), the estimated value $\hat{x}_k$ of the system state variable $x_k$ at the moment k and the variance $P_k$ thereof are output as follows:

$$\hat{x}_k=\hat{x}_k^i \quad \text{(formula 10), and}$$

$$P_k=P_k^i \quad \text{(formula 11),}$$

where $\hat{x}_k$ is the estimated value of the system state variable at the moment k, and $P_k$ is the variance of $\hat{x}_k$.

In a preferred example of the present disclosure, the following is further included: in step (3), the actuator fault and the variance at the moment k are predicted at the moment k−1 according to a dynamic actuator fault equation as shown in formula (1):

$$\hat{f}_k^-=\tau\hat{f}_{k-1} \quad \text{(formula 12), and}$$

$$\Delta_k^-=\Theta\Delta_{k-1}\Theta^T \quad \text{(formula 13),}$$

where $\hat{f}_k^-$ is the predicted value of the actuator fault at the moment k; $\Delta_k^-$ is the predicted variance of the actuator fault at the moment k; $\hat{f}_{k-1}$ is the estimated value of the actuator fault at the moment k−1; $\Delta_{k-1}$ is the variance of $\hat{f}_{k-1}$; $\Theta=\tau I$, and I is a unit matrix; and $\tau\in(0,1]$ is an adjustable parameter.

In a preferred example of the present disclosure, the following is further included: iteratively updating the predicted actuator fault and variance at the moment k according to the Bayesian theory specifically includes the following steps:

$$\hat{f}_k^i=\hat{f}_k^-+\Delta_k^-(\Delta_k^-+P_k^-)^{-1}(\hat{x}_k^i-A\hat{x}_{k-1}-\hat{f}_k^-) \quad \text{(formula 14), and}$$

$$\Delta_k^i=\Delta_k^--\Delta_k^-(\Delta_k^-+P_k^-)^{-1}\Delta_k^- \quad \text{(formula 15),}$$

where $\hat{f}_k^i$ is an estimated value of the actuator fault obtained by the i-th iteration at the moment k, $\hat{f}_k^-$ is the predicted value of the actuator fault at the moment k, $\Delta_k^-$ is the predicted variance of the actuator fault at the moment k, $P_k^-$ is the predicted variance of the system state variable at the moment k, $\hat{x}_k^i$ is the estimated value of the system state variable obtained by the i-th iteration at the moment k, $\hat{x}_{k-1}$ is the estimated value of the system state variable at the moment k−1, and $\Delta_k^i$ is a variance of the actuator fault obtained by the i-th iteration at the moment k.

In a preferred example of the present disclosure, the following is further included: in step (3), the estimated value $f_k$ of the actuator fault at the moment k and the variance $\Delta_k$ thereof are output as follows:

$$f_k=\hat{f}_k^i \quad \text{(formula 16), and}$$

$$\Delta_k=\Delta_k^i \quad \text{(formula 17).}$$

In a preferred example of the present disclosure, the following is further included: the estimation method further includes: establishing a dynamic state model and a dynamic observation model of an open-loop control loop including the actuator fault, and preprocessing obtained observation data using a 3δ criterion, the preprocessing including eliminating a singular value.

In a preferred example of the present disclosure, the system is a one-degree-of-freedom torque system, the actuator is a motor in the one-degree-of-freedom torque system, a fault estimation of the actuator is a fault estimation of the motor, and the fault includes: inter-turn or interphase short circuit of a stator winding of the motor, bar breaking of a rotor, eccentricity of a rotor shaft, and generation of an additional signal caused by a phenomenon that uniformity of an electromagnetic field in an air gap is damaged.

Beneficial Effects

According to the estimation methods of actuator faults based on bayesian learning provided in the present disclosure, for actuator fault diagnosis in a random system, an actuator fault can be estimated well, and further information about an amplitude of the fault, a position where the fault occurs, a nature of the fault, etc., can further be provided, thereby providing required information for subsequent troubleshooting. Through the method provided in the present disclosure, the shortcomings of the prior art in this aspect are overcome, which is specifically reflected as follows: the actuator fault is modeled based on the random walking model, real-time estimated values of the system state variable and the actuator fault are obtained by online learning using a Bayesian learning algorithm, and whether a fault occurs to the automatic control system where the actuator is located at present can be directly determined through the estimated value of the actuator fault. When the fault occurs, time when the present fault occurs, a present fault value, and a state variable that the present fault occurs to can also be directly obtained by the estimation method of the present disclosure.

DETAILED DESCRIPTION

The present disclosure will be further described below with reference to the drawings and specific examples to ensure that those skilled in the art can understand and implement the present disclosure better. However, the listed examples are not intended to limit the present disclosure.

Example 1

Figure 1:
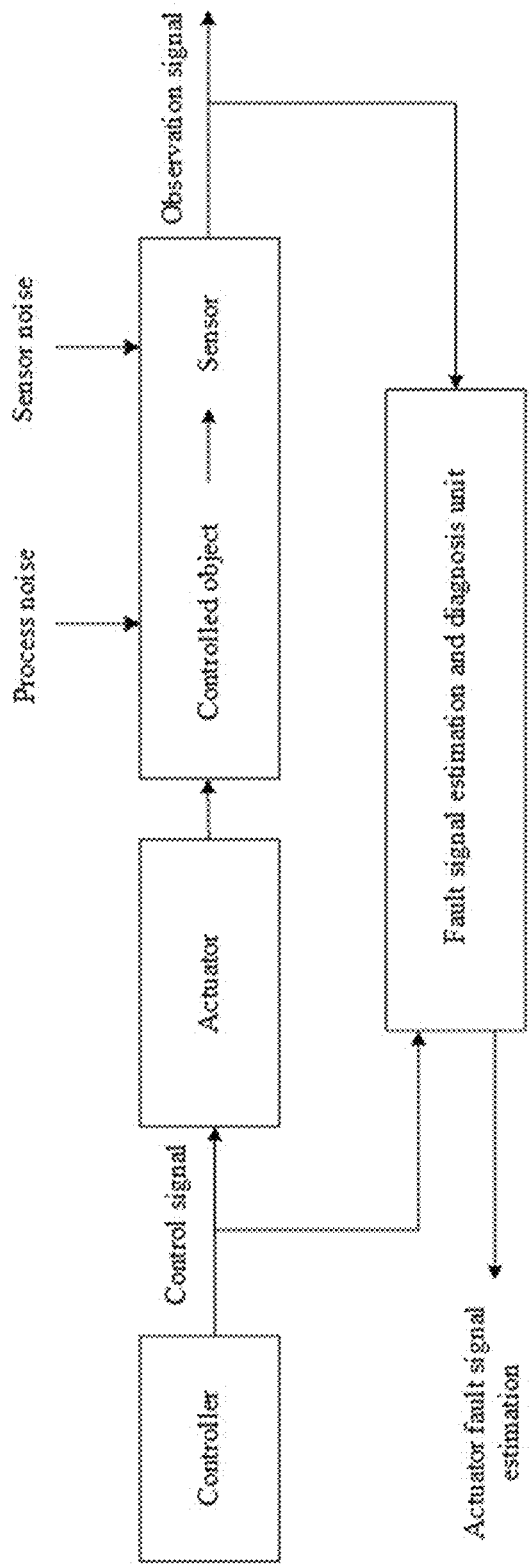
FIG. 1 is an open-loop structure diagram of an automatic control system where an actuator is located.

The present example discloses a estimation methods of actuator faults based on bayesian learning. The method is introduced below with application to a navigation positioning system as an example. As shown in FIG. 1, a state model and an observation model are created for a navigation control loop including an actuator:

$$x_k = Ax_{k-1} + Bu_{k-1} + f_k + w_{k-1} \quad \text{(formula 18), and}$$

$$y_k = Cx_k + v_k \quad \text{(formula 19).}$$

where $x_k = [x_{k,1}, \dot{x}_{k,1}]$ is a system state variable, $x_{k,1}$ and $\dot{x}_{k,1}$ representing a displacement and a speed respectively; $y_k$ is a noisy observation signal, and in a navigation positioning system, $y_k$ is a displacement obtained through a sensor; $u_{k-1}$ is a controller output, and in the navigation positioning system, the controller output $u_{k-1}$ is an acceleration; $f_k$ is a potential actuator fault; $w_{k-1}$ is a process white noise, and $w_{k-1} \sim N(0, Q_k)$ follows a Gaussian distribution; $Q_k$ is a known variance of the process noise $w_{k-1}$; k is a time sequence; $R_k$ is a variance of an observation noise $v_k$; A is a state transition matrix; B is a controller input matrix; C is an observation matrix of a state; $v_k$ is the observation noise, and $v_k \sim N(0, R_k)$ follows a Gaussian distribution; $N(0, Q_k^f)$ is a Gaussian distribution of which a mean value is 0 and a variance is $Q_k^f$; and $N(0, R_k)$ is a Gaussian distribution of which a mean value is 0 and a variance is $R_k$.

Since a dimension of the state of a controlled object is relatively high, and the number of sensors that are mounted is limited, a dimension of the observation signal is usually lower than the dimension of the system state variable. In addition, since industrial data records usually include much exceptional data, a 3δ criterion is used to perform singular value elimination and data cleaning on obtained data. Here, the 3δ criterion is that information within three times of a standard deviation is valid information and information beyond three times of the standard deviation is a singular value.

Figure 2:
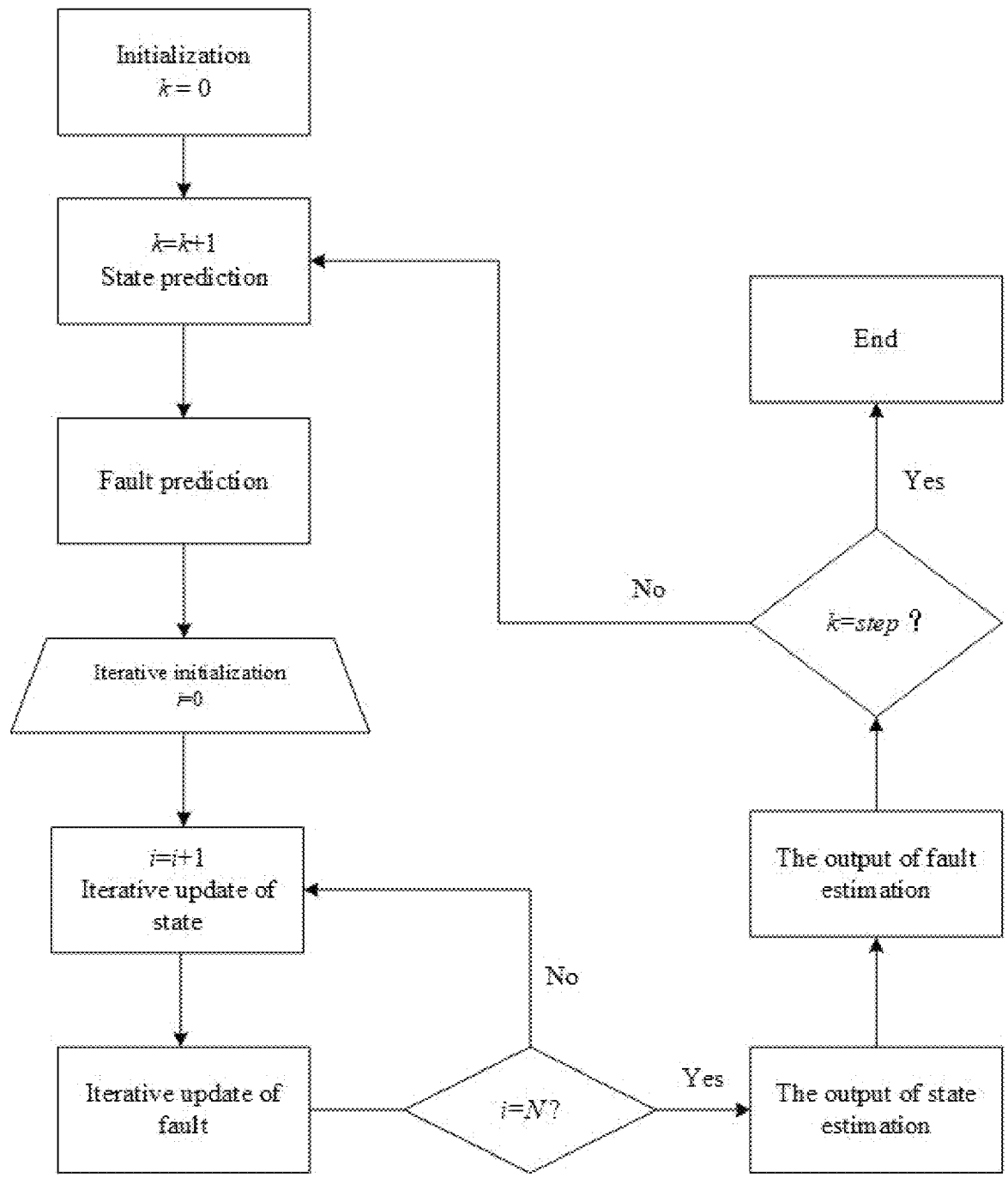
FIG. 2 is a flowchart of an actuator fault estimation method according to Example 1.

Specifically, as shown in FIG. 2, the estimation method specifically includes the following steps.

In step 1, since time when an actuator fault occurs, a value assigned when the actuator fault occurs, a duration, and a subsequent dynamic condition are all unknown and needed by subsequent steps, the actuator fault is dynamically modeled at first based on a random walking model, as shown in formula (1):

$$f_k = f_{k-1} + w_k^f \quad \text{(formula 1),}$$

where $f_k$ is a potential actuator fault at a moment k; $f_{k-1}$ is a potential actuator fault at a moment k-1; $w_k^f$ is a white noise following a Gaussian distribution $w_k^f \sim N(0, Q_k^f)$, and $Q_k^f$ is a known noise variance; k is a time sequence; and $N(0, Q_k^f)$ is a Gaussian distribution of which a mean value is 0 and a variance is $Q_k^f$.

In step 2, related parameters are initialized.

Since an algorithm uses a recursive structure, the related parameters need to be initialized at the moment k=0. Correspondingly, a maximum time length step is given, a maximum iteration step count is set to N, an initial value of a system state variable is $\hat{x}_0$, a corresponding initial variance is $P_0$, an initial value of an estimated value of the actuator fault is $\hat{f}_0 = 0$, and a fault variance is $\Delta = 0$.

In step 3, approximate estimation is performed on a joint posterior probability distribution of the system state variable and the actuator fault.

The joint posterior probability distribution $p(x_k, f_k | y_{1:k})$ of the system state variable and the actuator fault are represented using two mutually independent hypothesis distributions $q(x_k | y_{1:k})$ and $q(f_k | y_{1:k})$ based on a variational Bayesian theory, namely:

$$p(x_k, f_k | y_{1:k}) = q(x_k | y_{1:k}) q(f_k | y_{1:k}) \quad \text{(formula 2), and}$$

the joint posterior probability distribution of the system state variable and the actuator fault are approximated at a moment k−1 as follows:

$$q(x_{k-1} | y_{1:k-1}) = N(\hat{x}_{k-1}, P_{k-1}) \quad \text{(formula 3), and}$$

$$q(f_{k-1}|y_{1:k-1})=N(\hat{f}_{k-1},\Delta_{k-1}) \qquad \text{(formula 4)},$$

where $y_{1:k}=\{y_1, y_2, \ldots, y_k\}$ represents a collection of observation signals from a moment 1 to the moment k, $x_k$ is a system state variable at the moment k, $\hat{x}_{k-1}$ represents an estimated value of the system state variable at the moment k−1, $P_{k-1}$ is a variance of $\hat{x}_{k-1}$, $\hat{f}_{k-1}$ is an estimated value of the actuator fault at the moment k−1, and $\Delta_{k-1}$ is a variance of $\hat{f}_{k-1}$.

In step 4, the system state variable and the actuator fault at the moment k are predicted at the moment k−1.

First, the system state variable and the variance at the moment k are predicted at the moment k−1 according to a state model equation, i.e., formula (18), of an open-loop control loop where an actuator is located:

$$\hat{x}_k^-=A\hat{x}_{k-1}+Bu_{k-1}+\hat{f}_{k-1} \qquad \text{(formula 5), and}$$

$$P_k^-=AP_{k-1}A^T+\Delta k_{k-1}+BQ_kB^T \qquad \text{(formula 6)},$$

where $\hat{x}_k^-$ is a predicted value of the system state variable at the moment k, $P_k^-$ is a predicted variance of the system state variable at the moment k, $\hat{x}_{k-1}$ is an estimated value of the system state variable at the moment k−1, $\hat{f}_{k-1}$ is an estimated value of the actuator fault at the moment k−1, $u_{k-1}$ is a controller output of an automatic control system, $P_{k-1}$ is a variance of $\hat{x}_{k-1}$, $\Delta_{k-1}$ is a variance of $\hat{f}_{k-1}$, $Q_k$ is a known variance of the process noise, A is a state transition matrix, and B is a controller input matrix.

Second, the actuator fault and the variance at the moment k are predicted at the moment k−1 according to a dynamic actuator fault equation, i.e., formula (1):

$$\hat{f}_k^-=\tau\hat{f}_{k-1} \qquad \text{(formula 12), and}$$

$$\Delta_k^-=\Theta\Delta_{k-1}\Theta^T \qquad \text{(formula 13)},$$

where $\hat{f}_k^-$ is the predicted value of the actuator fault at the moment k; $\Delta_k^-$ is the predicted variance of the actuator fault at the moment k; $\hat{f}_{k-1}$ is the estimated value of the actuator fault at the moment k−1; $\Delta_{k-1}$ is the variance of $\hat{f}_{k-1}$; $\Theta=\tau I$, and I is a unit matrix; and $\tau\in(0,1]$ is an adjustable parameter. If $\tau\in(0,1]$ approaches to 1, the estimated value of the fault will be smooth, but a response speed is low. If $\tau\in(0,1]$ approaches to 0, the response speed will be fast, but the randomness is high.

In step 5, initialization is performed for iterative updating.

The predicted values at the moment k−1 are used as initial values for iterative updating at the moment k, namely $\hat{x}_k^{i=0}=\hat{x}_k^-$, $P_k^{i=0}=P_k^-$, $\hat{f}_k^{i=0}=\hat{f}_k^-$, and $\Delta_k^{i=0}=\Delta_k^-$. Here, i represents an iteration step count, and the maximum iteration step count is set to N.

In step 6, the predicted system state variable and actuator fault are iteratively updated according to the Bayesian theory.

First, the predicted system state variable and variance at the moment k are iteratively updated according to the Bayesian theory, specifically including the following steps:

$$\hat{x}_k^i=\hat{x}_k^-+\hat{f}_k^{i-1}+K(y_k-C(\hat{x}_k^-+\hat{f}_k^{i-1})) \qquad \text{(formula 7)},$$

$$P_k^i=P_k^--KCP_k^- \qquad \text{(formula 8), and}$$

$$K=P_k^-C^T(CP_k^-C^T+R_k)^{-1} \qquad \text{(formula 9)},$$

where $\hat{x}_k^i$ is an estimated value of the system state variable obtained by an i-th iteration at the moment k; $\hat{x}_k^-$ is the predicted value of the system state variable at the moment k; $\hat{f}_k^{i-1}$ is an estimated value of the actuator fault obtained by an i−1-th iteration at the moment k; i represents the iteration step count, and the maximum iteration step count thereof is set to N; K is a filter gain in the automatic control system; $y_k$ is an observed value of the system state variable at the moment k; C is an observation matrix of the system state variable; $P_k^i$ is a variance of the system state variable obtained by the i-th iteration at the moment k; $P_k^-$ is the predicted variance of the system state variable at the moment k; and $R_k$ is a variance of an observation noise.

Second, the predicted actuator fault and variance at the moment k are iteratively updated according to the Bayesian theory, specifically including the following steps:

$$\hat{f}_k^i=\hat{f}_k^-+\Delta_k^-(\Delta_k^-+P_k^-)^{-1}(\hat{x}_k^i-A\hat{x}_{k-1}-\hat{f}_k^-) \qquad \text{(formula 14), and}$$

$$\Delta_k^i=\Delta_k^--\Delta_k^-(\Delta_k^-+P_k^-)^{-1}\Delta_k^- \qquad \text{(formula 15)},$$

where $\hat{f}_k^i$ is an estimated value of the actuator fault obtained by the i-th iteration at the moment k, $\Delta_k^-$ is the predicted variance of the actuator fault at the moment k, $P_k^-$ is the predicted variance of the system state variable at the moment k, $\hat{x}_k^i$ is the estimated value of the system state variable obtained by the i-th iteration at the moment k, $\hat{x}_{k-1}$ is the estimated value of the system state variable at the moment k−1, $\hat{f}_k^-$ is the predicted value of the actuator fault at the moment k, $\Delta_k^i$ is a variance of the actuator fault obtained by the i-th iteration at the moment k, and $\Delta_k^-$ is the predicted variance of the actuator fault at the moment k.

In step 7, whether i=N is satisfied is judged, if YES, the next step is executed, otherwise, i=i+1, and a skip to first in step 6 is made.

In step 8, the estimated value of the system state variable at the moment k and the variance of the estimated value are output:

$$\hat{x}_k=\hat{x}_k^i \qquad \text{(formula 10), and}$$

$$P_k=P_k^i \qquad \text{(formula 11)},$$

where $\hat{x}_k$ is the estimated value of the system state variable at the moment k, and $P_k$ is the variance of $\hat{x}_k$.

In step 9, the actuator fault $f_k$ at the moment k and the variance $\Delta_k$ thereof are output:

$$f_k=\hat{f}_k^i \qquad \text{(formula 16), and}$$

$$\Delta_k=\Delta_k^i \qquad \text{(formula 17)}.$$

In step 10, whether $k=_{step}$ is satisfied is judged, if YES, the method is ended, otherwise k=k+1, and a skip to step 2 is made, where step is the maximum time length.

In step 11, if the estimated value of the actuator factor is 0, it is determined that no actuator fault occurs, and if the estimated value of the actuator fault is deviated from 0, it is determined that the actuator fault occurs.

Example 2

Figure 3:
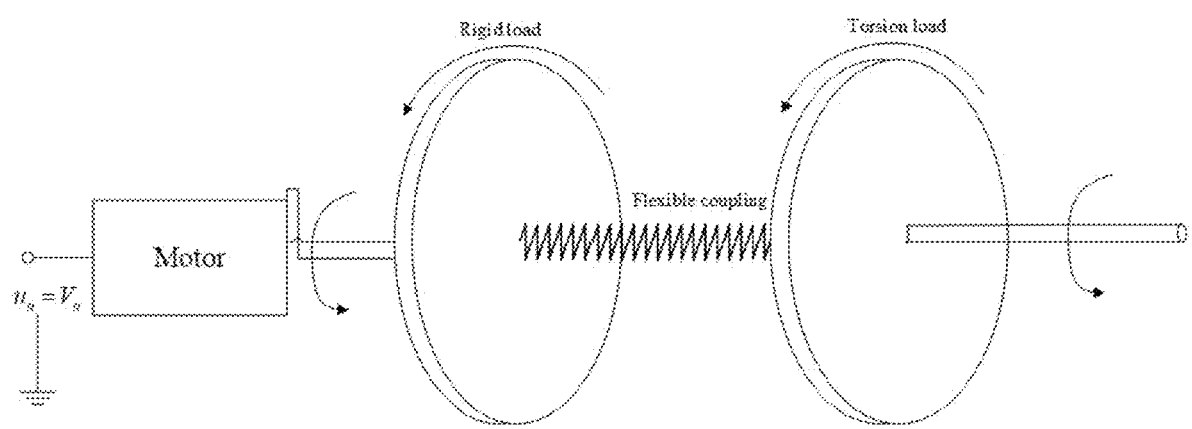
FIG. 3 is a structural schematic diagram of a torque system according to Example 2.

In the present example, the estimation method in Example 1 is used to perform fault estimation on a controlled object, i.e., a motor in a one-degree-of-freedom torque system. Multiple torque modules may be connected based on the torque system to form a multi-degree-of-freedom torque system, which can simulate a flexible coupling effect between an actuating mechanism and a load in a complex industrial process, or some applications or equipment with torsional compliances and flexible joints, such as mechanical structures like a high-gear-ratio harmonic transmission and a light transmission shaft. The one-degree-of-freedom torque system is formed by coupling a rotary torque module and a rotary basic servo unit, the rotary servo unit is on one side, and the direct current motor is horizontally connected with an output shaft, and can drive a torsional load through a flexible coupling. FIG. 3 shows the structural schematic diagram of the torque system.

In practical uses, the motor in the torque system is a main device that drives the load, i.e., an actuator of the torque system. An electromagnetic relationship in the motor is very complex. Besides, continuous high-speed running and the influence of electrical, mechanical and environmental running conditions, etc., may easily cause the phenomena of winding loosening, insulation deterioration, bearing abrasion, intensified vibration, high temperature overheating, etc., to further cause various faults, such as inter-turn or interphase short circuit of a stator winding of the motor, bar breaking of a rotor, eccentricity of a rotor shaft, the phenomenon that the uniformity of an electromagnetic field in an air gap is damaged, and the phenomenon that a magnetic potential of the air gap is non-uniform due to existence of a high-order harmonic in a current of the stator winding. Therefore, describing, analyzing and estimating an actuator fault is an effective method for ensuring the system performance.

The torque system is modeled. A system state variable is $x_k = [x_{n,1}, x_{n,2}, \dot{x}_{n,1}, \dot{x}_{n,2}]$, where $x_{n,1}$ and $x_{n,2}$ represent angular positions of a rigid load and a tortional load respectively. In addition, the two variables are measured by a coder to form an observation signal $y_k$. A control signal $u_k$ is a voltage signal applied to the motor. A potential actuator fault $f_k$ is simulated by a random walking model. Matrices A, B and C in a state space model are obtained respectively as follows:

$$A = \begin{bmatrix} 0.978 & 0.022 & 0.0096 & 7.2814 \times 10^{-5} \\ 0.0878 & 0.9122 & 2.9161 \times 10^4 & 0.0094 \\ -4.2578 & 4.2578 & 0.9122 & 0.0214 \\ 17.012 & -17.012 & 0.0858 & 0.8436 \end{bmatrix},$$

$$B = \begin{bmatrix} 0.0223 \\ 3.3744 \times 10^{-4} \\ 4.3913 \\ 0.1335 \end{bmatrix}, \text{ and}$$

$$C = \begin{bmatrix} 1 & 0 & 0 & 0 \\ 0 & 1 & 0 & 0 \end{bmatrix}.$$

Moreover, a variance of a process noise and a variance of an observation noise are respectively as follows:

$$Q_k = \begin{bmatrix} 0.001 & 0 & 0 & 0 \\ 0 & 0.001 & 0 & 0 \\ 0 & 0 & 0.001 & 0 \\ 0 & 0 & 0 & 0.001 \end{bmatrix}, \text{ and}$$

$$R_k = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

The whole implementation process lasts for 10 s, sampling time is 0.01 s, and totally 1,000 sample data points are collected. A starting point of the whole implementation case is as follows:

$$x_0 = \begin{bmatrix} 0 \\ 0 \\ 0 \\ 0 \end{bmatrix}, \text{ and } P_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

An iteration step count is N=2, and an adjustable parameter is $\tau = 0.9$. A noise variance introduced to the random walking model for the fault is:

$$Q_k^f = \begin{bmatrix} 0.01 & 0 & 0 & 0 \\ 0 & 0.01 & 0 & 0 \\ 0 & 0 & 0.01 & 0 \\ 0 & 0 & 0 & 0.01 \end{bmatrix}.$$

Figure 4:
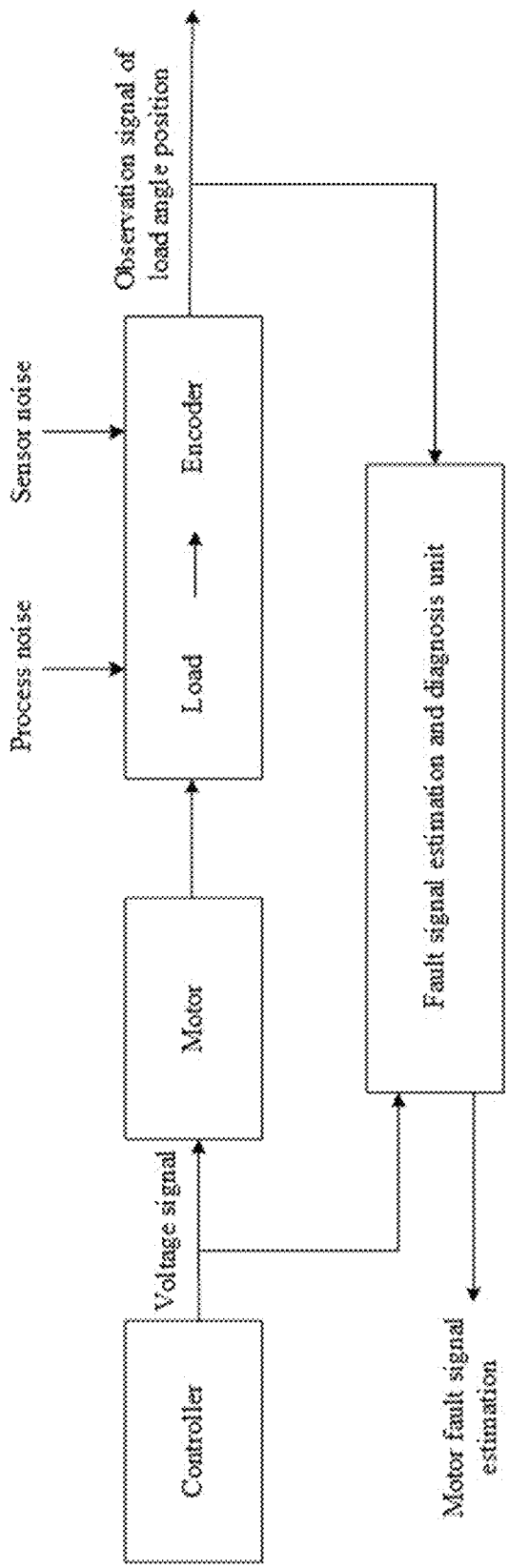
FIG. 4 is a flow block diagram of application of a method of the present disclosure to a one-degree-of-freedom torque system according to Example 2.
Figure 5A:
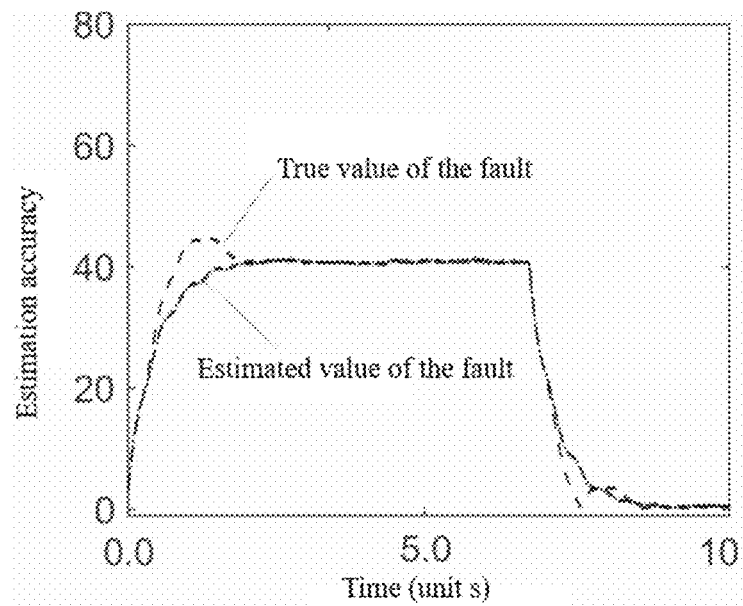
FIG. 5A is an estimation effect diagram of a fault signal of a first fault square wave according to Example 2.
Figure 5B:
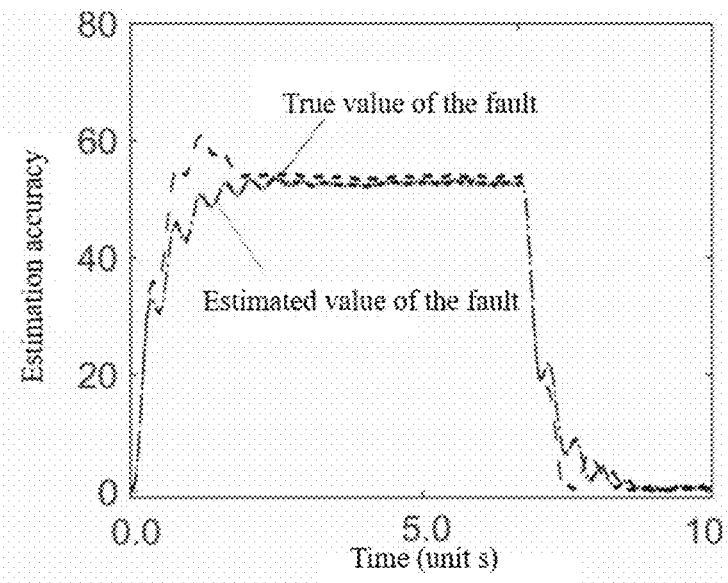
FIG. 5B is an estimation effect diagram of a fault signal of a second fault square wave according to Example 2.
Figure 6A:
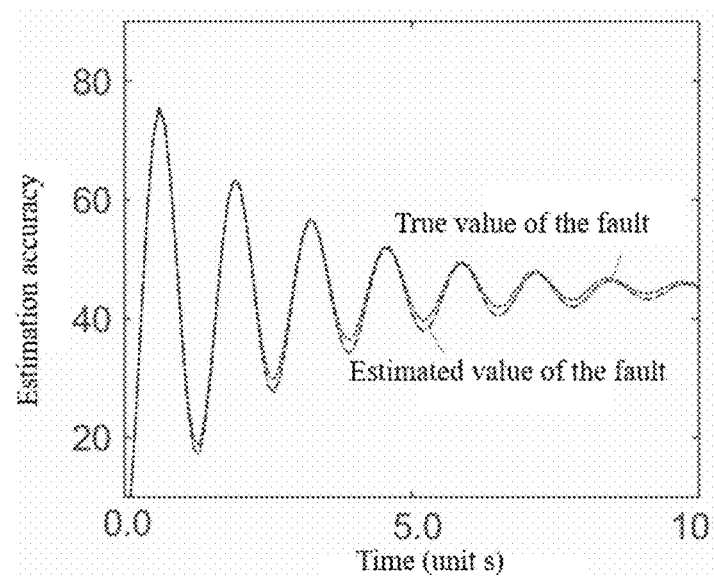
FIG. 6A is an estimation effect diagram of a fault signal of a first trigonometric wave according to Example 2.
Figure 6B:
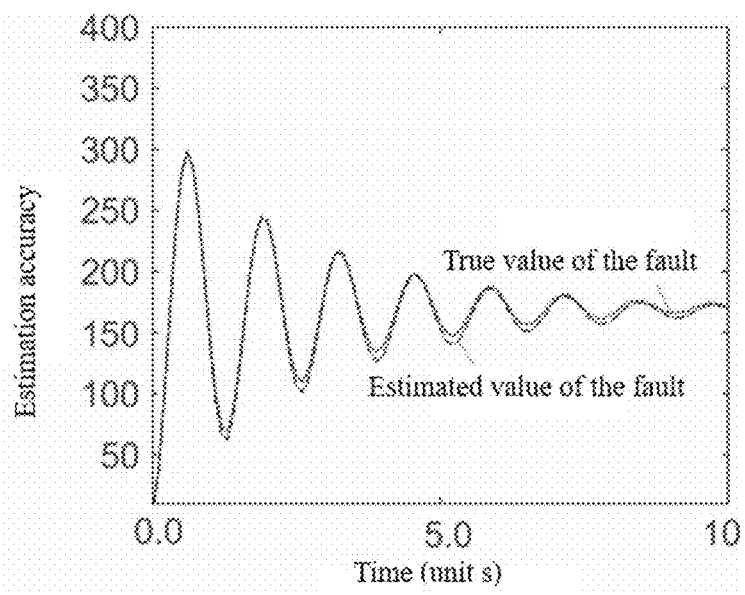
FIG. 6B is an estimation effect diagram of a fault signal of a second trigonometric wave according to Example 2.

FIG. 4 shows a flow block diagram of application of the present disclosure to the one-degree-of-freedom torque system. FIG. 5A, FIG. 5B, FIG. 6A, and FIG. 6B show implementation effects of the method of the present disclosure in the one-degree-of-freedom torque system. FIG. 5A and FIG. 5B show estimation effects of two types of square actuator faults in the present disclosure. FIG. 6A and FIG. 6B show estimation effects of trigonometric actuator faults in the present disclosure. It can be seen from the implementation effect diagrams that, when an amplitude of an estimated value of an actuator fault is not 0, it indicates that a fault occurs to the motor in the torque system, and time when the fault occurs can be rapidly determined accordingly. In addition, comparison with an actuator fault curve in simulation shows that a fault can be detected immediately when the fault occurs, and an amplitude of a fault signal can be obtained relatively accurately, to thereby implement accurate estimation of the fault of the motor.

The method proposed in the present disclosure is applied to the fields of motion control systems represented by a three-degree-of-freedom helicopter system, process control systems represented by a continuous stirred tank reactor, etc.

The above examples are only preferred examples listed for completely describing the present disclosure and not intended to limit the scope of protection of the present disclosure. Equivalent replacements or transformations made by those skilled in the art based on the present disclosure fall within the scope of protection of the present disclosure. The scope of protection of the present disclosure is defined by the claims.

What is claimed is:

1. An estimation method of actuator faults in a system, based on Bayesian learning, comprising the following steps:
   step (1): modeling an actuator fault as follows based on a random walking model:

$$f_k = f_{k-1} + w_k^f \quad \text{(formula 1)},$$

where $f_k$ is a potential actuator fault at a moment k, $f_{k-1}$ is a potential actuator fault at a moment k-1, $w_k^f$ is a process noise, and k is a time sequence;

step (2): representing a joint posterior probability distribution $p(x_k, f_k | y_{1:k})$ of a system state variable $x_k$ and the actuator fault $f_k$ using two mutually independent hypothesis distributions $q(x_k | y_{1:k})$ and $q(f_k | y_{1:k})$ based on a variational Bayesian theory, namely:

$$p(x_k, f_k | y_{1:k}) = q(x_k | y_{1:k}) q(f_k | y_{1:k}) \quad \text{(formula 2), and}$$

approximating the joint posterior probability distribution of the system state variable $x_k$ and the actuator fault $f_k$ at the moment k-1 as follows:

$$q(x_{k-1}|y_{1:k-1})=N(\hat{x}_{k-1},P_{k-1}) \quad \text{(formula 3), and}$$

$$q(f_{k-1}|y_{1:k-1})=N(\hat{f}_{k-1},\Delta_{k-1}) \quad \text{(formula 4)},$$

where $y_{1:k}=\{y_1, y_2, \ldots, y_k\}$ represents a collection of observation signals from a moment 1 to the moment k, $\hat{x}_{k-1}$ represents an estimated value of the system state variable at the moment k−1, $P_{k-1}$ is a variance of $\hat{x}_{k-1}$, $\hat{f}_{k-1}$ is an estimated value of the actuator fault at the moment k−1, and $\Delta_{k-1}$ is a variance of $\hat{f}_{k-1}$;

step (3): predicting, at the moment k−1, a system state variable and an actuator fault at the moment k, and iteratively updating, at the moment k, a predicted system state variable and a variance and a predicted actuator fault and a variance according to the Bayesian theory to output an estimated value $\hat{x}_k$ of the system state variable $x_k$ at the moment k and a variance $P_k$ of the estimated value and to output an estimated value $\hat{f}_k$ of the actuator fault $\hat{f}_k$ at the moment k and a variance $\Delta_k$ thereof, step (4): upon determination that the estimated value $\hat{f}_k$ of the actuator fault $f_k$ is 0, increment k by one and then performing step (2) and step (3); upon determination that the estimated value $\hat{f}_k$ of the actuator fault $f_k$ is not 0, overhauling the system;

wherein the system is a one-degree-of-freedom torque system, the actuator is a motor in the one-degree-of-freedom torque system, a fault estimation of the actuator is a fault estimation of the motor, and the actuator fault comprises: inter-turn or interphase short circuit of a stator winding of the motor, bar breaking of a rotor, eccentricity of a rotor shaft, and generation of an additional signal caused by a phenomenon that uniformity of an electromagnetic field in an air gap is damaged.

2. The estimation method according to claim 1, wherein, in the step (3), predicted values at the moment k−1 are used as initial values for iterative updating at the moment k, namely $\hat{x}_k^{i=0}=\hat{x}_k^-$, $P_k^{i=0}=P_k^-$, $\hat{f}_k^{i=0}=\hat{f}_k^-$, and $\Delta_k^{i=0}=\Delta_k^-$, where i represents an iteration step count, and a maximum iteration step count thereof is set to N; $\hat{x}_k^-$ is a predicted value of the system state variable at the moment k; $P_k^-$ is a predicted variance of the system state variable at the moment k; $\hat{f}_k^-$ is a predicted value of the actuator fault at the moment k; $\Delta_k^-$ is a predicted variance of the actuator fault at the moment k; $\Theta=\tau I$, and I is a unit matrix; and $\tau\in(0,1]$ is an adjustable parameter.

3. The estimation method according to claim 1, wherein, in the step (3), the system state variable and the variance at the moment k are predicted at the moment k−1 according to a dynamic model equation of an automatic control system where an actuator is located, as shown in formula (5):

$$\hat{x}_k^-=A\hat{x}_{k-1}+Bu_{k-1}+\hat{f}_{k-1} \quad \text{(formula 5), and}$$

$$P_k^-=AP_{k-1}A^T+\Delta k_{k-1}+BQ_kB^T \quad \text{(formula 6)},$$

where $\hat{x}_k^-$ is the predicted value of the system state variable at the moment k, $P_k^-$ is a predicted variance of the system state variable at the moment k, $\hat{x}_{k-1}$ is the estimated value of the system state variable at the moment k−1, $\hat{f}_{k-1}$ is the estimated value of the actuator fault at the moment k−1, $u_{k-1}$ is a controller output of the automatic control system where the actuator is located, $P_{k-1}$ is the variance of $\hat{x}_{k-1}$, $\Delta_{k-1}$ is the variance of $\hat{f}_{k-1}$, $Q_k$ is a variance of the process noise, A is a state transition matrix, and B is a controller input matrix.

4. The estimation method according to claim 3 wherein the iteratively updating the predicted system state variable and variance at the moment k according to the Bayesian theory comprises the following steps:

$$\hat{x}_k^i=\hat{x}_k^-+\hat{f}_k^{i-1}+K(y_k-C(\hat{x}_k^-+\hat{f}_k^{i-1})) \quad \text{(formula 7)},$$

$$P_k^i=P_k^--KCP_k^- \quad \text{(formula 8), and}$$

$$K=P_k^-C^T(CP_k^-C^T+R_k)^{-1} \quad \text{(formula 9)},$$

where $\hat{x}_k^i$ is an estimated value of the system state variable obtained by an i-th iteration at the moment k; $\hat{x}_k^-$ is the predicted value of the system state variable at the moment k; $\hat{f}_k^{i-1}$ is an estimated value of the actuator fault obtained by an i−1-th iteration; i represents the iteration step count, and the maximum iteration step count thereof is set to N; K is a filter gain in the automatic control system where the actuator is located; $y_k$ is an observed value of the system state variable at the moment k; C is an observation matrix of the system state variable; $P_k^i$ is a variance of the system state variable obtained by the i-th iteration at the moment k; $P_k^-$ is the predicted variance of the system state variable at the moment k; and $R_k$ is a variance of an observation noise.

5. The estimation method according to claim 4, wherein, in the step (3), the estimated value $\hat{x}_k$ of the system state variable $x_k$ at the moment k and the variance $P_k$ thereof are output as follows:

$$\hat{x}_k=\hat{x}_k^i \quad \text{(formula 10), and}$$

$$P_k=P_k^i \quad \text{(formula 11)},$$

where $\hat{x}_k$ is the estimated value of the system state variable at the moment k, and $P_k$ is the variance of $\hat{x}_k$.

6. The estimation method according to claim 1, wherein, in the step (3), the actuator fault and the variance at the moment k are predicted at the moment k−1 according to a dynamic actuator fault equation as shown in formula (1):

$$\hat{f}_k^-=\tau\hat{f}_{k-1} \quad \text{(formula 12), and}$$

$$\Delta_k^-=\Theta\Delta_{k-1}\Theta^T \quad \text{(formula 13)},$$

where $\hat{f}_k^-$ is the predicted value of the actuator fault at the moment k; $\Delta_k^-$ is the predicted variance of the actuator fault at the moment k; $\hat{f}_{k-1}$ is the estimated value of the actuator fault at the moment k−1; $\Delta_{k-1}$ is the variance of $\hat{f}_{k-1}$; $\Theta=\tau I$, and I is a unit matrix; and $\tau\in(0,1]$ is an adjustable parameter.

7. The estimation method according to claim 6, wherein the iteratively updating the predicted actuator fault and variance at the moment k according to the Bayesian theory comprises the following steps:

$$\hat{f}_k^i=\hat{f}_k^-+\Delta_k^-(\Delta_k^-+P_k^-)^{-1}(\hat{x}_k^i-A\hat{x}_{k-1}-\hat{f}_k^-) \quad \text{(formula 14), and}$$

$$\Delta_k^i=\Delta_k^--\Delta_k^-(\Delta_k^-+P_k^-)^{-1}\Delta_k^- \quad \text{(formula 15)},$$

where $\hat{f}_k^-$ is an estimated value of the actuator fault obtained by the i-th iteration at the moment k, $\hat{f}_k^-$ is the predicted value of the actuator fault at the moment k, $\Delta_k^-$ is the predicted variance of the actuator fault at the moment k, $P_k^-$ is the predicted variance of the system state variable at the moment k, $\hat{x}_k^i$ is the estimated value of the system state variable obtained by the i-th iteration at the moment k, $\hat{x}_{k-1}$ is the estimated value of the system state variable at the moment k−1, and $\Delta_k^i$ is a variance of the actuator fault obtained by the i-th iteration at the moment k.

8. The estimation method according to claim 7, wherein, in the step (3), the estimated value $f_k$ of the actuator fault at the moment k and the variance $\Delta_k$ thereof are output as follows:

$$f_k = \hat{f}_k^i \quad \text{(formula 16), and}$$

$$\Delta_k = \Delta_k^i \quad \text{(formula 17).}$$

9. The estimation method according to claim 1, further comprising: establishing a dynamic state model and a dynamic observation model of an open-loop control loop comprising the actuator fault, and preprocessing obtained observation data using a 3δ criterion, the preprocessing comprising eliminating a singular value.

* * * * *